United States Patent Office 3,399,048
Patented Aug. 27, 1968

3,399,048
SUBSTITUTED BENZYL N-METHYLCARBAMATES
AS HERBICIDES
Richard A. Herrett, Raleigh, N.C., and Robert V.
Berthold, South Charleston, W. Va., assignors to
Union Carbide Corporation, a corporation of New
York
No Drawing. Original application Apr. 2, 1963, Ser. No.
269,874. Divided and this application May 19, 1965,
Ser. No. 457,189
10 Claims. (Cl. 71—106)

ABSTRACT OF THE DISCLOSURE

Substituted benzyl N-methylcarbamates, especially 3,4-dichlorobenzyl N-methylcarbamate, are used as selective pre-emergence herbicides.

---

This application is a division of applicants' Ser. No. 269,874, filed Apr. 2, 1963, now abandoned.

This invention relates to new chemical compounds useful as contact herbicides when applied to plant foliage. These compounds also display unusual properties of selective herbicidal action when applied as pre-emergence treatments.

The undesirability of a mixed population of weed plants and crop plants is universally acknowledged. Weeds compete for sunlight, moisture, and nutrients; they harbour insects and disease; and they create serious problems in the harvest operation. The overall effect of weeds is a reduction in the crop value.

Efforts to combat these weed problems have been helped considerably by the introduction of chemicals possessing powerful hormonal properties. Generally, the chemicals will effectively remove broad-leaf weeds from narow-leaf or grassy crops. These chemicals are not without problems, however. Because of their toxicity to broad-leaf plants, they will kill crops not of the narrow-leaf class when accidentally sprayed on such crops. This danger can be substantially obviated by use of a selective pre-emergence herbicide. A second major disadvantage associated with these materials is their failure to control grassy weeds. This disadvantage has been alleviated to some extent with the introduction of new herbicides. Many new materials such as the triazines and substituted ureas are confronted with the problems of excessive soil residues and their uses are somewhat limited.

Heretofore, some of the most efficient and widely used selective pre-emergence herbicides were the N-aryl-O-alkyl carbamates, as exemplified by the commercially available isopropyl N-(3-chlorophenyl)carbamate. These chemicals, while very useful, possess inherent disadvantages that limit their application. For example, when applying isopropyl N-(3-chlorophenyl)carbamate there is often found a narrow margin of safety with respect to crop tolerance to the chemical, i.e. doses only slightly higher than those required for effective weed control induce undesirable phytotoxic effects in the crop. In addition, the effectiveness of this chemical is highly sensitive to soil temperature (high activity is associated with low temperatures) and this sensitivity, coupled with the low degree of crop tolerance, frequently makes the use of this compound very hazardous. Another drawback to the use of these known carbamate herbicides resides in their highly variable residual life in the soil, again apparently influenced by temperature.

We have now found that a new class of compounds posses the basic desiderata of pre-emergence herbicides to a greater extent than do known materials. Thus, our compounds are surprisingly superior in two fundamental respects:

(1) A high tolerance of the crop to our chemicals is found at concentrations sufficient for substantially complete weed control, i.e. there is a broad margin of safety to avoid undesirable phytotoxic effects to the crop; and (2) Broad-spectrum activity is displayed by our chemicals with respect to variety of weed species controlled and this activity is coupled with broad-spectrum crop tolerance.

In addition, the compounds of this invention possess important secondary advantages in that their effectiveness is not highly susceptible to variation with changing environmental conditions. Thus, our materials are effective at both low and relatively high soil temperatures, e.g. 85° C., and their residual life appears not as adversely affected by ambient temperature changes as that of known materials.

Our operative materials are characterized as halogenated or nitrated benzyl N-methylcarbamates and can thus be depicted by the general formula:

(I)
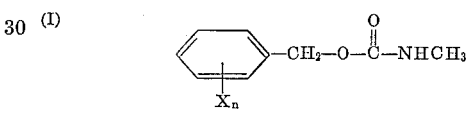

wherein X is a halogen, such as chlorine, bromine, fluorine, or iodine, preferably chlorine, or a nitro radical, and $n$ is an integer from 1 to 5.

We have found that the position of the halogen or nitro radicals on the phenyl ring has a profound influence on the herbidical activity and selective action of the compound. Thus, substitution at one or both of the 3 and 4 positions is vastly preferred, as demonstrated by the data in Table I, below, wherein several isomeric dichlorobenzyl N-methylcarbamates were evaluated.

We have further found that other structural characteristics of our novel compounds are narrowly critical in that even minor variation thereof results in substantial loss of herbicidal activity. For example if the carbamate nitrogen substitution is changed from N-methyl drastic reduction of bioactivity is observed (see Table II, below).

In addition, it has been demonstrated that alteration of the simple —CH$_2$— linkage between the phenyl ring and the oxy bridge of the ester group results in diminished effectiveness.

Our compounds possess activity both as pre-emergence and post-emergence herbicides and, accordingly, one aspect of this invention comprises the application of the operative materials to undesired vegetation by any means whereby said materials are brought into contact with living plants (which include seeds and germinating seedlings), e.g., by application to the soil before any plants emerge or by direct application to foliage.

While our materials can be applied directly to undesired vegetation and thus be used as indiscriminate plant killers, we have found surprising selectivity when applying them to the soil in pre-emergence treatment. In such treatment both grassy weeds such as crabgrass, wild oats, barnyard grass, yellow foxtail, green foxtail, quack grass, and rye grass, and broad-leaf weeds such as mustard, pigweed, lambsquarters, and sheep sorrel are readily controlled while a broad spectrum of crops is unaffected. Illustrative of tolerant crops are cotton, soybeans, peanuts, beans, peas, onions, alfalfa, red clover, lespediza, field corn, and the like.

In addition to soil applications, our materials are effective as algaecides when applied to the media (e.g., water or soil) supporting the growth of algae.

Our new toxicants may be applied conveniently in the form of a spray containing the active ingredient in a concentration within the range of 0.01–20.0% by weight, and preferably from 1 to 10.0% by weight. Thorough coverage of the foliage is effective for contact killing. For pre-emergence control of plants amounts within the range of ¼ to 100 pounds per acre are generally used.

Although most of the esters are insoluble in water, they are soluble in common organic solvents. Most of them are soluble in acetone, chloroform, ethyl alcohol, ethyl acetate, benezene, ether and heptane. The esters may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecylbenzenesulfonate, an amine salt as for example dibutylammonium dodecylbenzenesulfonate, alkali metal salts of sulfated fatty alcohols, ethylene oxide condensation products of alkyl phenols, or tall oil or higher mercaptans and other dispersing and wetting agents. Formulation of dry compositions is accomplished by mixing with finely divided solid carriers. Suitable carriers comprise talc, clay, pyrophyllite, silica and fuller's earth. Usually the toxicant will be only a minor proportion. The dry formulation may be used as a dust or dispersed in aqueous medium before application. If the latter it is convenient to incorporate a wetting or dispersing aid into the formulation.

Both the solid and the liquid formulations above described are useful in the application of herbicides because they facilitate uniform distribution and aid in the destruction of undesirable plants by maintaining the active ingredient in a form which enables prompt assimilation by the plant and efficient utilization of its weed destroying properties. The described conditioning agents enable the proper use by an unskilled operator without elaborate equipment to achieve the desired herbicidal effects.

The compounds of this invention are prepared by various techniques, analogous to known methods. One synthesis involves reacting a suitably substituted benzyl alcohol (I)

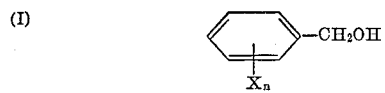

wherein X and $n$ are defined as before, with methyl isocyanate, $O=C=N-CH_3$, to give the desired N-methylcarbamate.

The methyl isocyanate addition can be carried out, generally, by contacting the alcohol with methyl isocyanate in an inert organic solvent, and preferably in the presence of a tertiary amine or organotin catalyst. The reaction may be effected at temperatures ranging from about 0° C. to about 100° C., and is preferably carried out between room temperature and about 80° C. Generally, temperatures in excess of about 100° C. are to be avoided in view of the competing side reactions of the product carbamate. The operating pressure may range from about 1 atmosphere to about 10 atmospheres, preferably from about 2 to about 3 atmospheres, and is dependent upon the concentration and vapor pressure of the volatile isocyanate at the reaction temperature. The inert organic solvents that can be employed in the reaction are those inert to isocyanates in general, i.e. those free of radicals such as hydroxy or amino radicals. Illustrative solvents are aliphatic and aromatic hydrocarbons, such as hexane, heptane, octane, benzene, toluene, and the like, and ethers such as diethyl ether, ethyl propyl ether, and the like. The reaction is preferably carried out in the presence of a tertiary amine or an organotin catalyst or a combination thereof. Illustrative of tertiaryamines suitable as catalysts are: N,N-dimethyl hydroxyethylamine, triethylene diamine, and dimethyl cyclohexylamine. The term "organotin catalyst" as used herein as meant to refer to such compounds as dibutyltin diacetate, dibutyltin dichloride, dibutyltin dimethoxide, dibutyltin dilaurate, dibutyltin maleate, dibutyltin di-2-ethylhexenoate, stannous octanoate, stannous oleate, and the like. Generally, amounts of said catalyst from about 0.1 to about 1.0 weight per cent of the starting material comprised of methyl isocyanate and the benzyl alcohol are sufficient. The mol ratio of methyl isocyanate to alcohol can range from 0.25:1 to about 4:1, but preferably an equimolar amount or slight excess of methyl isocyanate is employed to insure that the alcohol is completely reacted. The reaction time may vary from about 5 minutes to about 7 days, but normally, when operating in the preferred temperature range, reaction times of from about one-half hour to about five hours are sufficient for complete reaction.

The carbamate product formed, either a solid or oily liquid, can be recovered from the reaction mixture by means known to the art, e.g., by vacuum-distillation to drive off solvent and excess isocyanate.

An alternative procedure involves a two-step synthesis in which the alcohol (II) is reacted with phosgene to form the corresponding chloroformate which, in turn, is reacted with methylamine to give the desired compound as follows:

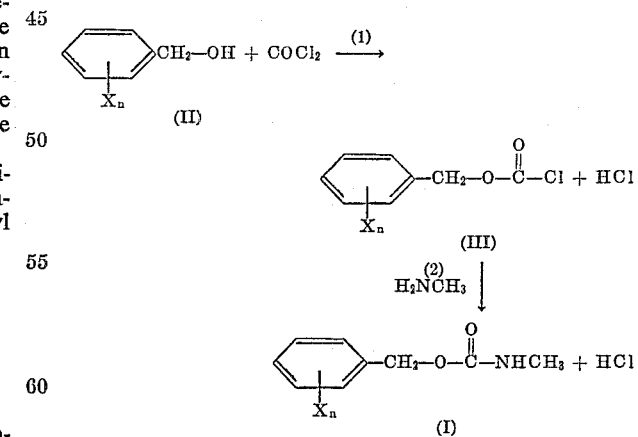

The chloroformate (III) is prepared by adding the alcohol (II) dissolved in an inert solvent, such as hydrocarbon or ether, to a solution of phosgene, dissolved in the same solvent, at a temperature of 0 to 10° C. After allowing the reaction to come to completion by stirring for a period of 0.5 to 4 hours, the excess phosgene is removed under vacuum and the chloroformate stripped free of solvent and distilled. Alternatively, the chloroformate is used in the production of the carbamate as a residue product still contained in the reaction solvent.

The choloroformate is added to a 100 percent excess of the desired amine contained in a solvent of the type used in the preparation of the chloroformate. The amine is used in excess to remove the hydrogen chloride evolved during the reaction which is conducted below 30° C. After allowing the reaction to come to completion, which usually requires from 0.5 to 2 hours, the mixture is diluted with water, the layers are separated and the organic layer is washed with water and then dried over a suitable desiccant such as anhydrous sodium sulfate. The dried organic layer is distilled to remove the solvent and the resulting product carbamate, while usually sufficiently pure to be used as a residue product, may be further purified by vacuum distillation or recrystallization from a suitable solvent.

The starting alcohols (II) are compounds well-known to the art and can be prepared by hydrolyzing the corresponding benzyl chlorides, or, can be prepared by reducing the corresponding benzaldehyde or benzoic acid with, e.g., sodium borohydride or lithium aluminum hydride.

The following examples are illustrative.

EXAMPLE I 3,4-dichlorobenzyl alcohol was produced as follows: To a solution of 58 grams of 3,4-dichlorobenzaldehyde in 250 milliliters of methyl alcohol was added, with stirring, 9 grams of sodium borohydride in small portions and with occasional cooling to maintain the reaction temperature below 30° C. After the addition was completed, the reaction mixture was warmed to reflux, then cooled and diluted with water. The resulting mixture was extracted with portions of diethyl ether, the ether extracts were combined and dried over sodium sulfate. The ether was then evaporated from the combined extracts and the residual oil was distilled through an eight-inch column to obtain a clear oily distillate product, boiling point 97° C. at 0.4 mm. Hg, which solidified on cooling. The yield of 3,4-dichlorobenzyl alcohol was 92 percent of the theoretical.

In accordance with the general procedure described above, a mixture of 20 grams of 3,4-dichlorobenzyl alcohol and 20 grams of methyl isocyanate in 50 milliliters of dry diethyl ether and one drop of dibutyltin diacetate was allowed to stand in a pressure bottle at room temperature for 48 hours. The ether and excess methyl isocyanate were then removed from the reaction mixture by distillation and the residual oil was distilled through an eight-inch Vigreux column to yield 3,4-dichlorobenzyl N-methylcarbamate as a colorless liquid distillate (boiling point 139° C. at 0.5 mm. Hg) which solidified upon cooling, melting point 53–4° C. The yield was 83 percent of the theoretical.

*Elemental analysis.*—Calculated for $C_9H_9NO_2Cl_2$: C, 46.18; H, 3.87; N, 5.98; Cl, 30.29. Found: C, 46.35; H, 3.80; N, 6.10; Cl, 30.03.

EXAMPLES II–IV

Using exactly the same procedure as described for the preparation of 3,4-dichlorobenzyl N-methylcarbamate (Example I), employing one drop of dibutyltin diacetate as the catalyst in all cases, the following phenyl ring-substituted benzyl N-methylcarbamates were prepared:

In similar fashion, the following compounds were prepared:

| Compound | Melting Point, °C. | Nitrogen Analysis | |
|---|---|---|---|
| | | Calculated | Found |
| 2,4-dichlorobenzyl-CH₂—O—C(=O)—NHCH₃ | 103–104 | 5.98 | 6.02 |
| 2,5-dichlorobenzyl-CH₂—O—C(=O)—NHCH₃ | *131–134/0.4 | 5.98 | 5.93 |
| 3,5-dichlorobenzyl-CH₂—O—C(=O)—NHCH₃ | 131–132 | 5.98 | 6.03 |
| 2,3-dichlorobenzyl-CH₂—O—C(=O)—NHCH₃ | 128–129 | 5.98 | 6.05 |
| 2,4-dichlorobenzyl-CH₂—O—C(=O)—NHCH₃ | 76–77 | 5.98 | 6.12 |

*Boiling point ° C./mm. Hg.

The effectiveness of our compounds as herbicides was determined by the following tests.

Suspensions of the test compounds were prepared by dissolving one gram of compound in 50 milliliters of acetone in which had been dissolved 0.1 gram (10 percent of the weight of compound) of an alkylphenoxy polyethoxyethanol surfactant, as an emulsifying or dispersing agent. The resulting solution or suspension was mixed into 150 milliliters of water to give roughly 200 milliliters of a suspension containing the compound in finely divided form. The thus-prepared stock suspension contained 0.5 percent by weight of compound. The test concentrations employed in the tests described hereinbelow were obtained by diluting the stock suspension with water.

EXAMPLE V

Compounds representative of this invention were tested with regard to pre-emergence herbicidal activity, i.e., their ability to inhibit seed germination, or to kill the seedlings at an early stage of growth, by the following test.

Two seed-soil mixtures were prepared, the first by mixing 53 cubic centimeters of perennial rye grass seed (*Lolium perenne*) and 27 cubic centimeters of Florida broadleaf mustard seed (*Brassica Pincea* var. *foliosa*) with 6100 cubic centimeters of sifted, fairly dry soil, the second by mixing 31 cubic centimeters of Golden Millet seeds (*Setaria italica* var. *stramineofructa*) and 12 cubic centimeters of Red Root seeds (*Amaranthus retroflexus*) with 6100 cubic centimeters of sifted, fairly dry soil.

| Example Number | Substituted Benzyl Alcohol | Weight (grams) | Methyl Isocyanate (grams) | Diethyl Ether (milliliters) | Yield (percent) of theory | Elemental Analysis | | Melting Point, °C. |
|---|---|---|---|---|---|---|---|---|
| | | | | | | Calculated | Found | |
| II | 4-chloro-3-nitro | 12 | 12 | 100 | ¹35 | N=11.45 | N=11.30 | 101 |
| III | 3-bromo | 19 | 19 | 40 | 100 | N=5.74 | N=5.68 | (²) |
| IV | 4-bromo-3-chloro | 5 | 5 | 35 | 79 | N=5.03 | N=5.14 | 68–69 |

¹ No catalyst used.
² Liquid product.

Each of the said two mixtures was rolled separately on a ball mill for about one-half hour to insure uniform mixing of seed and soil, and, for each chemical to be tested, a three-inch pot was filled with each of the mixtures, and the pots removed to the greenhouse and watered lightly.

About two hours after such planting, 25 milliliters of test solution obtained by diluting the afore-described stock suspension to 1000 parts per million with water was added to each of two pots containing the two separate mixtures. A control test, carried out as above but without addition of test compound, was also performed. The pots were held in the greenhouse and watered lightly for three weeks at which time observations were made as to the extent of injury of each plant species and each test compound was rated according to the following designations.

5 = no seedlings emerged, or those which did emerge subsequently died
4 = few seedlings emerged, and many of those which did emerge subsequently died
3 = moderate reduction in stand
2 = slight reduction in stand
1 = no injury; seedlings appear no different with respect to stand or growth than control The results of theses tests are set forth in Tables I and II below.

TABLE I

| Compound R—O—C(=O)—NHCH₃, R= | Seed Phytotoxicity Rating | | | |
|---|---|---|---|---|
| | Rye | Millet | Red Root | Mustard |
| 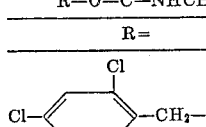 | 3 | 3 | 4 | 5 |
| 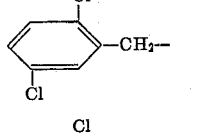 | 3 | 4 | 2 | 3 |
| 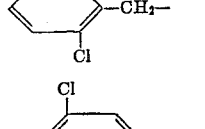 | 2 | 2 | 4 | 3 |
| 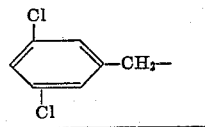 | 5 | 5 | 5 | 5 |
|  | 2 | 2 | 5 | 3 |

Thus it can be seen that of these five isomeric dichlorobenzyl compounds, the 3,4-dichlorobenzyl N-methylcarbamate is surprisingly outstanding in that complete kill of all four representative weed species was achieved. However, all of the isomers tested provided weed control.

Also tested according to the above procedure were the following compounds

TABLE II

| Compound R—O—C(=O)—NHCH₃, R= | Seed Phytotoxicity Rating | | | |
|---|---|---|---|---|
| | Rye | Millet | Red Root | Mustard |
| 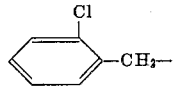 | 4 | 4 | 4 | 4 |
| 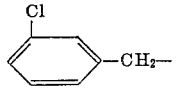 | 4 | 5 | 4 | 4 |
| 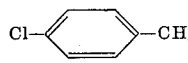 | 4 | 5 | 5 | 5 |
| 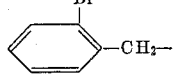 | 4 | 4 | 5 | 5 |
| 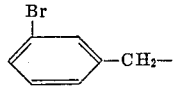 | 5 | 5 | 5 | 5 |
| 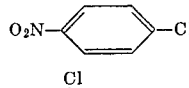 | 4 | 3 | 4 | 4 |
| 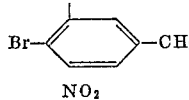 | 5 | 5 | 5 | 5 |
| 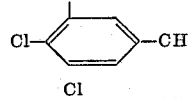 | 4 | 4 | 4 | 4 |
| 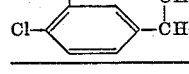 | 3 | 4 | 4 | 3 |

In addition, the following compounds were tested as described above but using a test concentration of 100 p.p.m. instead of 1000 p.p.m.

TABLE III

| 3,4-Cl₂-C₆H₃-CO₂-O-C(=O)-NR₁R₂ | | Seed Phytotoxicity Rating | | | |
|---|---|---|---|---|---|
| R₁= | R₂= | Rye | Millet | Red Root | Mustard |
| H | H | 3 | 3 | 4 | 3 |
| H | CH₃ | 4 | 5 | 5 | 4 |
| H | —CH(CH₃)CH₃ | 1 | 2 | 2 | 1 |
| CH₃ | CH₃ | 2 | 2 | 1 | 1 |
| —C₄H₉ | —C₄H₉ | 1 | 1 | 1 | 1 |

EXAMPLE VI

To investigate the effectiveness of compounds representative of this invention as foliage herbicides, i.e., in post-emergence application, the following tests were carried out.

The test plants were snap bean (*Phaseolus vulgaris* var. *humilis* Tendergreen) with the first trifoliate expanding, field corn (*Zea mays* var. *inducta*) six inches tall, and tomato (*Lycopersicon enulentum*) six inches tall. The plants were placed on a revolving turntable and sprayed for thirty seconds, using a hand spray gun set at 40 p.s.i.g., with test compound formulations containing 2500 parts by weight of compound per million parts of formulation. The sprayed plants were then removed to the greenhouse and held at 80° C. for ten days. After the ten-day period the results on each plant were visibly observed and each compound was rated according to the following designations:

5 = plant dead
4 = severe injury
3 = moderate injury
2 = slight injury
1 = no injury A control test, carried out as above but without any test compound in the formulation, resulted in no injury to the control plant.

In most instances stunting, burning, or chlorosis of the treated plants were also observed. The elevated concentrations used in obtaining these data do not preclude their utility in selectively controlling weeds at lower concentrations. Surprisingly, rice is resistant to these compounds after emergence.

To explore more fully the pre-emergence herbicidal activity of certain of our compounds, the following serial dilution experiments were carried out.

Flat metal containers were filled with an artificial soil consisting of sand and peat moss in equal volumes and nutrients added thereto (4 ounces of potassium nitrate, 4 ounces of potassium sulfate, 2½ pounds of superphosphate, 7½ pounds dolomite lime, and 2½ pounds of calcium carbonate lime per cubic yard of soil). These soil flats were then seeded with the indicated crops and weeds. Each test compound was applied at the various indicated concentrations by pre-emergence application in which the compound was applied to the flats within one day of seeding. Application was made by spraying the test formulation onto the flats moving on a continuous belt. In each case the soil flats were sub-irrigated after application of the chemical. Two weeks after application, results were observed and the degree of phytotoxic damage rated on a relative scale from 1 (no control) to 5 (complete kill). The results are set forth in Table V, below.

TABLE V

| Compound | Rate | Pre-emergence injury rating | | | | | | | | | | | | |
|---|---|---|---|---|---|---|---|---|---|---|---|---|---|
| | | Crops | | | | | | | Weeds | | | | | |
| | | Broad leaf | | | Grass | | | | Broad leaf | | | Grass | | |
| | | Cucumber | Soybeans | Cotton | Millet | Wheat | Corn | Rye | Amaranthus | Mustard | Lambs-quarters | Wild Oats | Yellow Foxtail | Crab Grass |
| 4-chlorobenzyl N-methylcarbamate. | 8 pounds per acre | 3 | ------ | 1 | 5 | 2 | 2 | 4 | 5 | 4 | 4 | 4 | 5 | 5 |
| | 2 pounds per acre | 2 | ------ | 1 | 2 | 1 | 1 | 2 | 3 | 2 | 3 | 2 | 3 | 3 |
| 2-chlorobenzyl N-methylcarbamate. | 8 pounds per acre | 2 | 1 | 1 | 1 | 1 | 1 | 2 | 3 | 3 | ------ | 2 | 3 | 3 |
| Benzyl N-methylcarbamate | 2 pounds per acre | 2 | 1 | 1 | 1 | 1 | 1 | 1 | 2 | 1 | ------ | 1 | 1 | 1 |
| 3,4-dichlorobenzyl N-methylcarbamate. | 8 pounds per acre | 5 | 2 | 2 | 5 | 3 | 3 | 5 | 5 | 4 | 5 | 5 | 5 | 5 |
| | 2 pounds per acre | 3 | 1 | 1 | 3 | 2 | 2 | 4 | 5 | 4 | 3 | 3 | 5 | 4 |
| | ½ pound per acre | 2 | 1 | 1 | 1 | 1 | 1 | 3 | 3 | 2 | 3 | 2 | 4 | 3 |
| 3-nitro-4-chlorobenzyl N-methylcarbamate. | 8 pounds per acre | 5 | 3 | 3 | 5 | 3 | 3 | 4 | 5 | 4 | ------ | 4 | 5 | 5 |
| | 2 pounds per acre | 1 | 1 | 1 | 2 | 1 | 1 | 2 | 4 | 2 | ------ | 2 | 2 | 3 |

Table IV, below, sets forth the results of these tests.

TABLE IV

| Compound<br>$R-O-\overset{O}{\underset{\|}{C}}-NHCH_3$<br>R = | Phytotoxicity Rating | | |
|---|---|---|---|
| | Bean | Corn | Tomato |
| 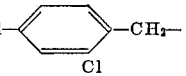 | 4 | 2 | 3 |
| 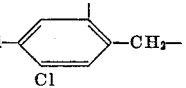 | 5 | 3 | 4 |
| 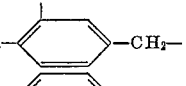 | 4 | 3 | 3 |
| 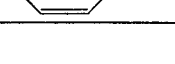 | 4 | 1 | 3 |

The effectiveness of 3,4-dichlorobenzyl N-methylcarbamate under actual field conditions is illustrated by the following test carried out under normal field conditions in the Southeastern United States.

A field was rototilled and row-seeded with the indicated crops and weeds in October. Immediately thereafter one-half liter portions of a test formulation, prepared by dissolving sufficient compounds in equal volumes of water and acetone to give the indicated rates in pounds of compound per acre, were applied to the test plots which measured 3 feet by 10 feet (one plot for each plant species). Application of the formulation was made using a hand sprayer having a single nozzle. Small amounts of rain occurred twice between application and observation of results. Eighteen days after application of the chemical results were observed by visual inspection and the performance of the compound against each plant species was rated according to the designations used in Example IV, above. The results are set forth in Table VI, below.

TABLE VI.—FIELD TEST EVALUATION OF 3,4-DICHLOROBENZYL N-METHYLCARBAMATE

| Concentration (pounds per acre) | Crops | | Weeds | | | | | |
| --- | --- | --- | --- | --- | --- | --- | --- | --- |
| | Cotton | Corn | Mustard | Rye Grass | Green Foxtail | Crab-grass | Carpet Weed * | Quack Grass |
| 1.0 | 1 | 1 | 2 | 2 | 2 | 3 | 5 | 3 |
| 2.5 | 1 | 2 | 3 | 2 | 3 | 5 | 5 | 4 |
| 5.0 | 1 | 2 | 4 | 3 | 4 | 5 | 5 | 4 |
| 10 | 2 | 3 | 4 | 5 | 5 | 5 | 5 | 4 |

*In this test the plot was naturally infested, not row-seeded, with carpet weed.

Further observation was made of the test plots during the following spring and it was noted that the residual action of 3,4-dichlorobenzyl N-methylcarbamate had persisted through the winter and good control of the carpet weed (the only winter annual of the weeds used) was being maintained.

Apart from the distinctive herbicidal activity of our compounds as herein disclosed, they also possess utility as insecticides, fungicides, and bactericide. In addition, our compounds may be used to enhance or stimulate the growth of plants by using low concentrations, or otherwise to modify plant growth.

What is claimed is:

1. A method of inhibiting undesired vegetation which comprises applying thereto, in herbicidally effective amounts, a benzyl N-methylcarbamate wherein at least one of the 3 and 4 phenyl ring position is substituted with a member selected from the group consisting of halogen atoms and nitro groups.

2. The method of claim 1 wherein the N-methylcarbamate is 3-chlorobenzyl N-methylcarbamate.

3. The method of claim 1 wherein the N-methylcarbamate is 3-bromobenzyl N-methylcarbamate.

4. The method of claim 1 wherein the N-methylcarbamate is 3,4-dichlorobenzyl N-methylcarbamate.

5. The method of claim 1 wherein the N-methylcarbamate is 4-chlorobenzyl N-methylcarbamate.

6. The method of claim 1 wherein the N-methylcarbamate is 3-nitro-4-chlorobenzyl N-methylcarbamate.

7. A method of selectively controlling the growth of weeds in soil also containing crop plants which comprises applying to the soil, prior to emergence of the weed plants and of the crop plants, a benzyl N-methylcarbamate wherein at least one of the 3 and 4 phenyl ring positions are halogen atoms and nitro groups, in an amount sufficient to control weeds.

8. A method of selectively controlling the growth of weeds in soil also containing crop plants which comprises applying to the soil, prior to emergence of the weed plants and of the crop plants, 3,4-dichlorobenzyl N-methylcarbamate, in an amount sufficient to control weeds.

9. A method of selectively controlling the growth of weeds in soil also containing crop plants which comprises applying to the soil, prior to emergence of the weed plants and of the crop plants, 3-bromobenzyl N-methylcarbamate, in an amount sufficient to control weeds.

10. Herbicidal compositions comprising an inert herbicidally acceptable carrier and, as an active toxicant, effective amounts of 3,4-dichlorobenzyl N-methylcarbamate.

References Cited

UNITED STATES PATENTS

| 3,046,302 | 6/1962 | Oja | 71—106 |
| 3,238,036 | 3/1966 | Herrett | 71—106 |
| 2,776,197 | 1/1957 | Gysin et al. | 71—2.3 |
| 3,098,001 | 7/1963 | Werres et al. | |
| 3,313,700 | 4/1967 | Bossinger et al. | 260—482 C |

FOREIGN PATENTS

| 886,425 | 1/1962 | Great Britain. |

LEWIS GOTTS, *Primary Examiner.*

G. HOLLRAH, *Assistant Examiner.*